(12) United States Patent
Grover et al.

(10) Patent No.: US 11,048,753 B2
(45) Date of Patent: Jun. 29, 2021

(54) FLEXIBLE RECORD DEFINITIONS FOR SEMI-STRUCTURED DATA IN A RELATIONAL DATABASE SYSTEM

(71) Applicant: McAfee, LLC, Santa Clara, CA (US)

(72) Inventors: Seth Grover, Idaho Falls, ID (US); Brian Howard Stewart, Idaho Falls, ID (US); Brian Roland Rhees, Idaho Falls, ID (US); Edmund William Leemhuis, Idaho Falls, ID (US)

(73) Assignee: McAfee, LLC, Santa Clara, CA (US)

( * ) Notice: Subject to any disclaimer, the term of this patent is extended or adjusted under 35 U.S.C. 154(b) by 606 days.

(21) Appl. No.: 15/844,927

(22) Filed: Dec. 18, 2017

(65) Prior Publication Data

US 2018/0285475 A1   Oct. 4, 2018

Related U.S. Application Data

(60) Provisional application No. 62/477,710, filed on Mar. 28, 2017.

(51) Int. Cl.
*G06F 16/84* (2019.01)
*G06F 16/28* (2019.01)

(52) U.S. Cl.
CPC ............ *G06F 16/86* (2019.01); *G06F 16/284* (2019.01)

(58) Field of Classification Search
CPC .................................................. G06F 16/2237
USPC ................................................. 707/744, 769
See application file for complete search history.

(56) References Cited

U.S. PATENT DOCUMENTS

| | | |
|---|---|---|
| 6,480,839 B1 | 11/2002 | Whittington et al. |
| 8,412,713 B2 | 4/2013 | Stewart et al. |
| 2009/0313210 A1* | 12/2009 | Bestgen .............. G06F 16/2237 |
| 2010/0198830 A1 | 8/2010 | Stewart et al. |

* cited by examiner

*Primary Examiner* — Baoquoc N To
(74) *Attorney, Agent, or Firm* — Hanley, Flight & Zimmerman, LLC

(57) ABSTRACT

Techniques related to flexible record definitions for semi-structured data in a relational database system are disclosed. The techniques include a machine readable medium, on which are stored instructions for accessing flexible record definitions for efficient database storage, comprising instructions that when executed cause a device to: receive a first request to create a first row in a database table, the first request indicating a first set of columns associated with the first row, determine that columns of the first set of columns are included in a second set of columns associated with the database table, select a first variant, from a set of variants, the first variant associated with a third set of columns, the third set of columns including at least the first set of columns, and write the first row to the database table based on the first variant and the third set of columns.

20 Claims, 8 Drawing Sheets

200

| Event sample data | | | | | | | |
|---|---|---|---|---|---|---|---|
| Row | Variant ID | Row Values | | | | | |
| 1 | 2 | CreateTime₁ | EndpointID₁ | UserName₁ | Domain₁ | Severity₁ | |
| 2 | 1 | CreateTime₂ | EndpointID₂ | IPSource₂ | IPDestination₂ | Protocol₂ | |
| 3 | 4 | CreateTime₃ | EndpointID₃ | PortDestination₃ | UserName₃ | | |
| 4 | 3 | CreateTime₄ | EndpointID₄ | Domain₄ | Severity₄ | IPSource₄ | IPDestination₄ | ... |
| 5 | 2 | CreateTime₅ | EndpointID₅ | UserName₅ | Domain₅ | Severity₅ | |
| ... | ... | ... | | | | | |

FLEXIBLE RECORD DEFINITIONS FOR SEMI-STRUCTURED DATA IN A RELATIONAL DATABASE SYSTEM

TECHNICAL FIELD

Embodiments described herein generally relate to the field of computer databases and, more particularly, to methods and systems related to a flexible record definition for semi-structured data in a relational database system.

BACKGROUND ART

Web server applications are used to provide users with access to data stored in databases over the Internet. These web server applications respond to incoming user requests by providing concurrent threads of execution, each of which responds to an individual request, while maintaining per-user web server application access information. These requests often require different types of searches, calculations or modifications of data stored in large databases.

In such environments, database oriented web server applications are required to maintain numbers of large result sets and to perform multiple types of calculations or insertions with high efficiency to maintain a reasonable performance level for the users. Databases are generally implemented in software to store structured data in a way to allow for easy analysis and retrieval. One commonly used database model for organizing and storing large amounts of data is a relational database. Generally, relational databases organize data into one or more tables. These tables store the relations of the data and the tables are made up of rows and columns where the rows represent a single item and columns represent attributes of the item. For example, a single row may represent a person with columns representing attributes of the person, such as having a first name of John, last name of Doe, and a birthday of Feb. 29, 2016. Conventional relational databases generally have rigid schemas such that each row for a given table has the same columns even where the column does not apply to a particular row. In certain cases, these columns may be empty and set to a null value. For example, a column for the last time the person went to Guam may be empty if the person has never been to Guam. A table or database may be sparse if, for each row, the same columns are allocated, regardless of whether a value exists for that column for a given row, and having a relatively large number of null or empty columns for the given row. These allocated columns take up space even when empty.

Semi-structured or heterogeneous data may present challenges to sparse databases. Semi-structured or heterogeneous data may include many types of data from multiple sources where the types of data between the multiple sources do not necessarily match with each other. For example, computer and communications networks today encompass mobile devices such as smartphones, tablet computers, as well as other Internet connected devices, such as Internet of Things (IoT) devices, which may generally communicate with other devices without direction from a user. Each of these devices potentially produces a distinct set of data. This heterogeneous data may include some overlapping fields, such as date/time information, but may also include data fields unique to each device. As a result, these devices may produce large amounts of disparate data, which may be stored in databases.

This disparate data may result in tables with a large number of empty columns for each row. For example, security information and event management (SIEM) systems may gather network event and flow data from many different types of endpoints and appliances and normalize this data to provide analysis, anomaly detection, and correlations. As SIEM data typically comes from many different sources, which are ever widening as more data sources are added, the data fields associated with the data gathered from these sources typically have only limited overlap, potentially resulting in a number of empty columns for many, if not all, of the rows. As another example, in big data type applications, disparate data may be aggregated from multiple sources in order to seek hidden correlations arising from the large data sets. As data sets become larger, the allocated, but empty columns increasingly become a size and performance issue.

Previously, attempts to address sparse tables have either forced data to match the schema, for example through data normalization, or continually altered the schema to accommodate new data variations. Self-describing data storage formats based on JavaScript Object Notation (JSON), Extensible Markup Language (XML), and Avro have also been used, although these may have performance issues. Non-relational database approaches have included semi-structured data stored using Resource Description Framework, which is a graph abstraction using subject-predicate-object statements, or triples. However, non-relational database approaches typically preclude the use of the relational model. Where the relational model is not used, ad-hoc querying using well known languages such as structured query language (SQL) may also be precluded. There exists a need for a database capable of dealing with large quantities of sparse, heterogeneous data while still maintaining the use of the relational model. Innovative tools are needed to assist in effective control and analysis of this data within computer and communication network environments.

BRIEF DESCRIPTION OF DRAWINGS

FIG. 2 is a diagram illustrating a flex table, according to one embodiment.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computing device" can refer to a single computing device or a plurality of computing devices working together to perform the function described as being performed on or by the computing device. Similarly, "a machine readable medium" can refer to a single physical medium or a plurality of media that together may store the material described as being stored on the machine readable medium.

Figure 1:
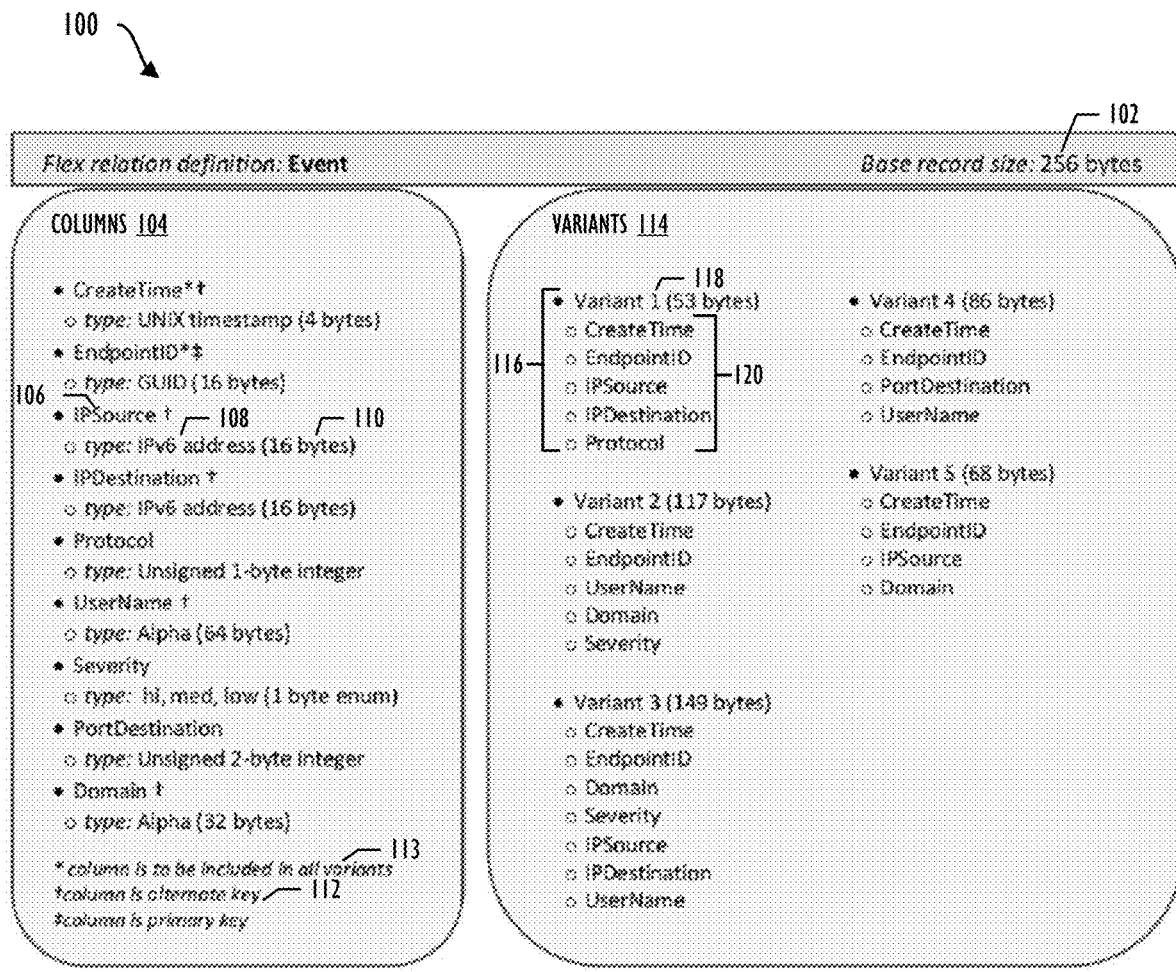
FIG. 1 is a diagram illustrating data elements of a flex table, according to one embodiment.

FIG. 1 illustrates data elements 100 of a flex table, according to one embodiment. An abstraction layer may be added between the regular rows and columns of a relational database in the form of flex tables. For example, a flex table may be implemented as a part of a database abstraction layer which connects to and interacts with a relational database such as a SQL server. The abstraction layer may receive requests to access or write data to the flex table, as discussed below and reformat these requests to a format compatible with the underlying relational database. For example, the abstraction layer may maintain a map for remapping requests for certain rows and columns to the appropriate locations of the underlying relational database. This remapping allows rows and columns to be appropriately sized to the underlying data and reducing the amount of null or empty columns for a row. This helps increase database storage efficiency, reduce database size for a given set of data, and increase performance as smaller database sizes helps increase the efficiency of caches or other temporary storage.

Rather than storing all columns for each row, a flex table defines a base record size 102 in bytes, which represents the maximum cumulative size of data values comprising a single row in the database. In this example, the base record size 102 is 256 bytes and thus a single row cannot be more than 256 bytes long. The base record size may be defined as not including overflow or binary blob data that may be attached.

The base record size 102 may be pre-defined or configurable. In certain cases, the base record size 102 may be reconfigured. For example, a flex table may initially be configured to utilize 256 byte base records. At some point, this size may be reconfigured to 512 bytes. As the base record size 102 represents the maximum size, changing the base record size does not impact rows created prior to the change. Rows created with the reconfigured 512 byte base record can coexist with rows created using the original 256 byte size. In certain cases, the base record size 102 may only be reconfigured such that the reconfigured size is larger than the original size. In other cases, reconfiguration with a smaller size than the original size may be permitted if no existing row is larger than the smaller size.

A set of columns 104 may be defined for flex tables. This set of columns includes all columns that may be utilized in the database. A column of the set of columns may include a set of properties. These properties may include, but are not limited to, a unique column name 106, a data type 108, a data size 110, and a key type 112. The unique column name 106 is a unique alphanumeric identifier for the column, here IPSource. In certain cases, the unique column name may be based on, but does not exactly match a user facing column name. For example, the set of columns may include two columns with display names of "Example." However, the unique columns names of the two columns may be "Example1" and "Example2." The data type 108 identifies the type of data stored in the column, here an IPv6 address. The data size 110 identifies the size, in bytes, of the data field, here 16 bytes. The key type 112 identifies the type of key associated with the column, here an alternate key. Certain columns in the set of columns 104 may be provided as default columns 113 and additional columns may be added to the set of columns 104 as needed. Generally, additional columns may be added at any point without requiring the table be locked and columns must first be added before they can be used in a row.

A set of variants 114 may also be defined for flex tables. The set of variants 114 define the types of rows that are available for use. A variant definition 116 includes a unique subset of columns, of the set of columns, available as a row in a flex table. A row, as defined by a variant definition, only contains values associated with the subset of columns specified in the variant definition 116. The variant definition 116 may be identified by a unique alphanumeric variant identifier 118. Each variant definition 116 includes a list of columns 120 and byte alignment for the values of the columns for any row associated with the variant definition 116. The list of columns 120 indicates the layout of the columns for the row associated with the variant definition 116. The columns are selected from the set of all possible columns 104. For example, a row associated with variant definition 116 may include the column names CreateTime, EndpointID, IPSource, IPDestination, and Protocol. The byte alignment may be based on the order of columns in the list of columns 120 and the byte alignment may include a four byte variant ID 118. The byte alignment of the variant definition 116 may specify that the CreateTime column may be aligned starting at byte 5, EndpointID at byte 9, IPSource at byte 25, IPDestination at byte 41, and Protocol at byte 57. These column and byte alignments are illustrative and by way of example only, and any desired set of columns from the set of all possible columns 104 and any arrangement of those columns may be used. The variant definition 116 may be stored as a part of the database with which it is associated with, for example, in a separate table, reserved portion of a table, as a binary blob within a binary data blob in a cell, etc. In certain cases, the variant definition 116 may be stored in a separate file maintained by the abstraction layer, and associated with the database table.

Certain columns may be required for all variants. In this example, columns for CreateTime and EndpointID are required for all variants. New variants may be added to the set of variants 114 as needed, so long as no two variants have the same subset of columns. The size of any particular variant may be based on the size of the columns that make up the variant, plus a four byte variant ID 118. However, the size of any particular variant cannot exceed the base record size. The total number of variants may be limited by a setting or by the four byte size of the variant ID 118, as variant IDs are unique. It may be understood that the variant ID 118 size described above is exemplary and other sized variant IDs may be used.

As the set of columns define the available columns and the set of variants define the available types of rows available for use, new columns and types of rows, as variants, may be added to the set of columns and set of variants without requiring a table to be locked. New columns and variants are just added to the set of columns and set of variants, respectively. Existing rows continue to be defined based on existing variants and do not need to be updated to reference the new rows or variants. As existing rows do not reference the new rows or variants, no additional information needs to be added to these existing rows. Newly created rows utilizing the newly added variants or columns can be simply be added to existing rows of a table.

Rows in a flex table are associated with a variant of the set of variants. Prior to storing column values in the binary structure of a new row, the variant associated with the new row is determined. This variant determination may explicitly specified, for example the variant ID may be provided in the call to create a new row. In certain cases, the variant determination may be made based on the variant that best fits the values provided. For example, a request may be received to create a row, where the requests indicates that columns named IPSource and Protocol be included in the new row. A search of the set of variants identifies the variants having at least the specified columns and then the smallest sized variant of the variants identified may be selected. In this case, variant 1 is selected and a row is created in the table based on variant 1. Other embodiments may use other criteria for choosing the variant from the subset of variants having the desired columns, such as the most frequently used variant or the most recently used variant.

FIG. 2 illustrates an example table of a flex table 200, according to one embodiment. A new row is written with reference to the variant definition associated with a particular variant ID. The variant ID may be stored in a variant ID column 202 in the first four bytes of the binary representation of the row and the layout of the row is based on the variant definition associated with that variant ID. Other record layouts and sizes of variant IDs can be used as desired. For example, row 2 may be associated with variant 1 with a variant ID of 1. Following the variant ID, the column values may be laid out according to the byte alignment in the variant definition for variant 1. For example, the binary representation of row 2 for variant 1 may be such that the CreateTime column may start at byte 5, EndpointID at byte 9, IPSource at byte 25, IPDestination at byte 41, and Protocol at byte 57. As each row is written based on the variant definition associated with the row, each row may be of a different size.

When a row of the flex table is read, the variant ID column 202 may be read to determine the variant ID and the variant definition associated with the row. The variant definition may then be looked up to obtain column information including the columns of the variant and byte alignment of the columns. The size of the column may also be looked up. The binary representation of the row may then be read in reference to the column list and byte alignment. For example, where the value of the IPSource column of row 2 is requested, the first four bytes of row 2 are read to determine that row 2 is associated with variant 1, that IPSource is a column that can be found in rows associated with variant 1, that the value may be found starting at byte 25 of the binary representation of row 2 and that the value is 16 bytes long. Row 2 may then be read from byte 25 through 40.

Database designs have addressed a demand for increasing the performance of database operations, specifically searches and queries, by introducing indexes (also called inverted indexes). Each index is defined and exists within the context of a table in the database. Many indexes are optional, and are created by the user to enhance the speed of one or more queries performed on the table. The user can define more than one index for the same table, basing the indexes on one or more columns defined in the table. When the user defines an index based on a columns in the table, the user is requesting the database to create a separate sorted list of all values of that column in that table, with a link from each value to the location of the corresponding record in the table.

Figure 3:
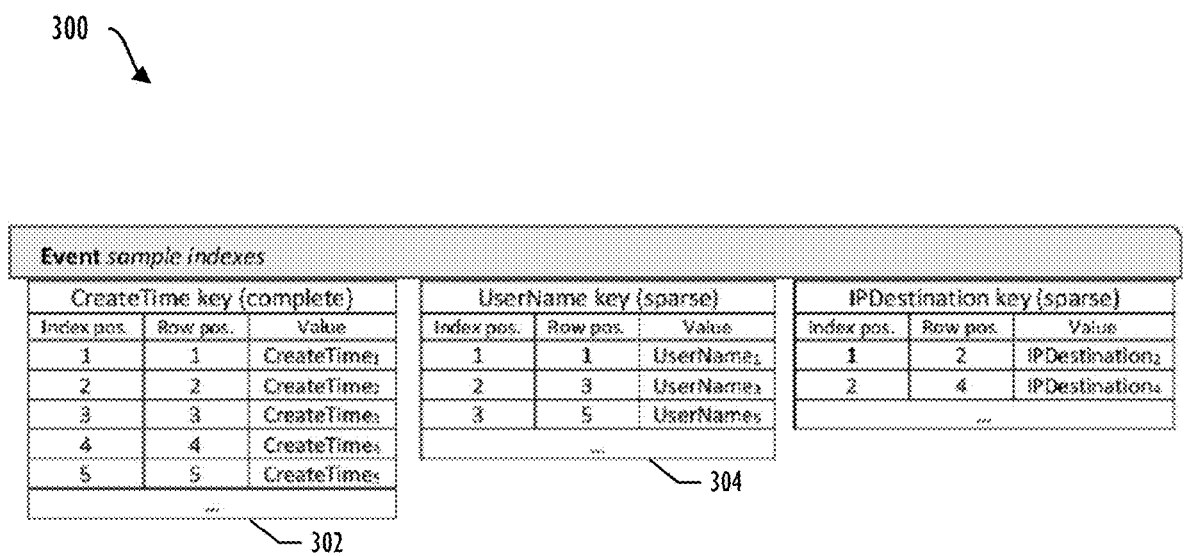
FIG. 3 is a diagram illustrating a flex table index, according to one embodiment.

FIG. 3 illustrates example indexes for flex tables 300, according to one embodiment. Flex tables support complete and sparse indexes of columns. As shown in index 302, a complete index may be created using a column included in all variants as the index key, such as a required column, here, CreateTime. Sparse indexes, which may not have a record for each row, may also be created for flex tables. Values in a sparse index for a flex table may be agnostic to the variant of the row from which the value came from. So a sparse index may include any row, regardless of the variant of the row, so long as the variant contains the column referenced in the sparse index as the index key. For example, an index 304 may be created including a particular column, here UserName. The set of variants may be scanned to determine the variants which include the column. In the example from FIG. 1, Variant 1, Variant 3, and Variant 5 include the UserName column. The flex table may then be scanned for rows having a variant ID matching the variants which include the column, here rows 1, 3, and 5 of the flex table illustrated in FIG. 2. These rows may then be included in the index 304. By including multiple variants in one index, flex tables allow for transparent indexing of columns across variants. This allows SQL aggregate functions, such as GROUP BY, COUNT, SUM, AVG, MIN, MAX, etc., to be run for columns despite the column not being included with each row. As shown by indexes 302 and 304, different sparse indexes may include entries for different subsets of the rows of the table, depending on which rows contain data in the columns associated with the index key.

Flex tables may also benefit from indexing techniques as described in U.S. Pat. Nos. 6,480,839, 8,412,713, and U.S. Pat. Appl. 2010/0198830, which are incorporated by reference herein in their entirety for all purposes.

Figure 4:
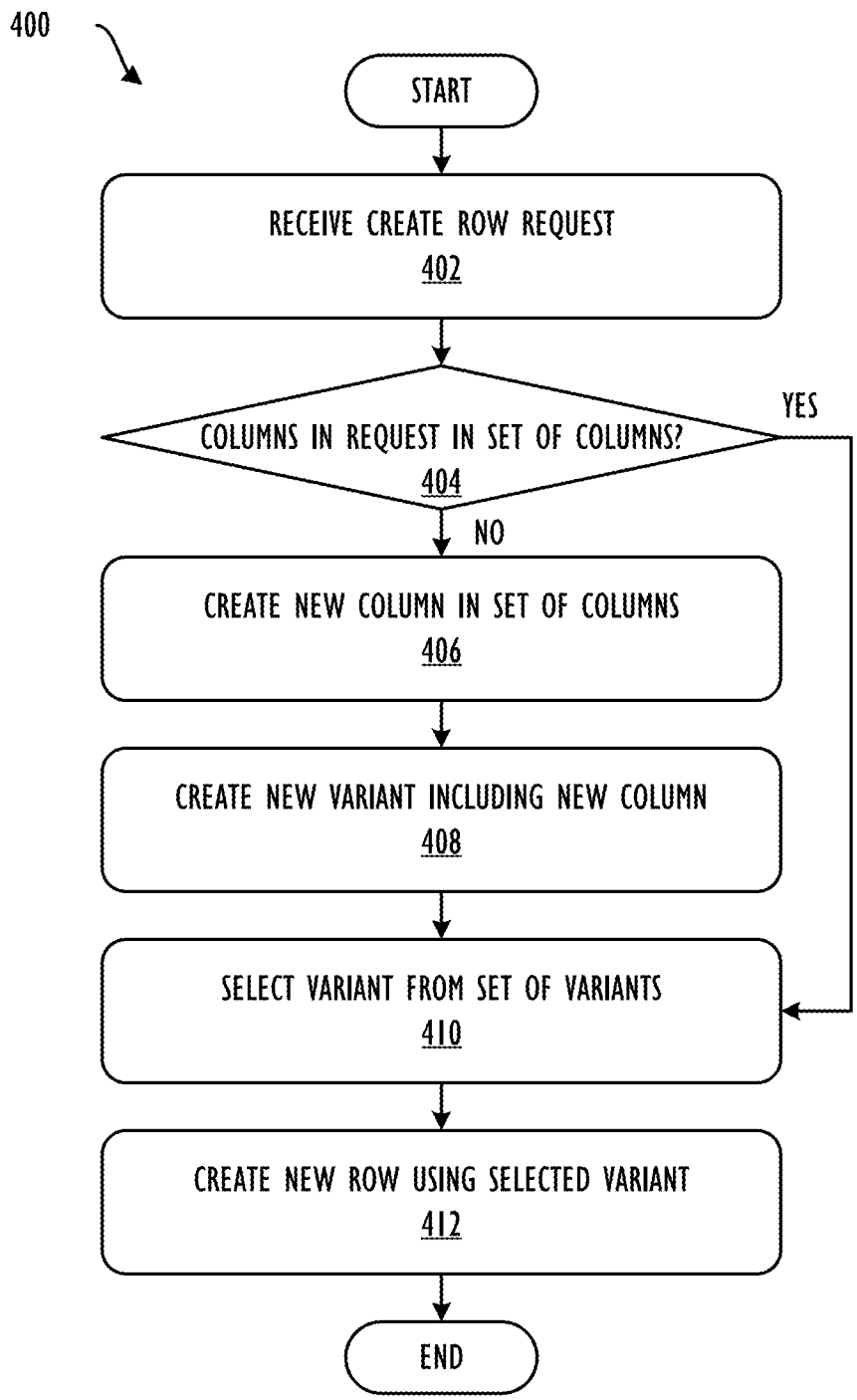
FIG. 4 is a flow diagram illustrating a technique for creating a row in a flex table, according to one embodiment.

FIG. 4 is a flow diagram illustrating a technique 400 for creating a row in a flex table, according to one embodiment. At block 402, a request to create a row is received by a database application utilizing flex tables. The request includes a row identifier indicating where the row should be created as well as an indication of the columns to be created for the row. At block 404, the each column indicated in the request is compared to the set of columns to verify that the column indicated is available in the set of columns. If a column indicated in the request is not available in the set of columns, then a new column is created in the set of columns based on the column indicated and any metadata in the request associated with the column indicated, at block 406. At block 408, a new variant is created including the new column. The variant may be based on an existing variant or based on the columns indicated in the request. At block 410, a variant is selected from the set of variants. If a new variant was created at block 408, then that variant is selected. If a particular variant ID 118 is indicated in the request, then the corresponding variant is selected. Otherwise, a variant may be selected using a predetermined criteria, such as which variant most closely matches the columns indicated in the request. For example, in one embodiment, if the columns indicated in the request are a subset of columns associated with a single variant of the set of variants, that variant is selected. If the columns indicated in the request are a subset of columns associated with multiple variants, then smallest variant, either in data size or number of columns, of the multiple variants is selected. Other criteria and techniques for selecting the variant may be used. At block 412, a new row is created in the flex table based on the selected variant with the data from the request.

Figure 5:
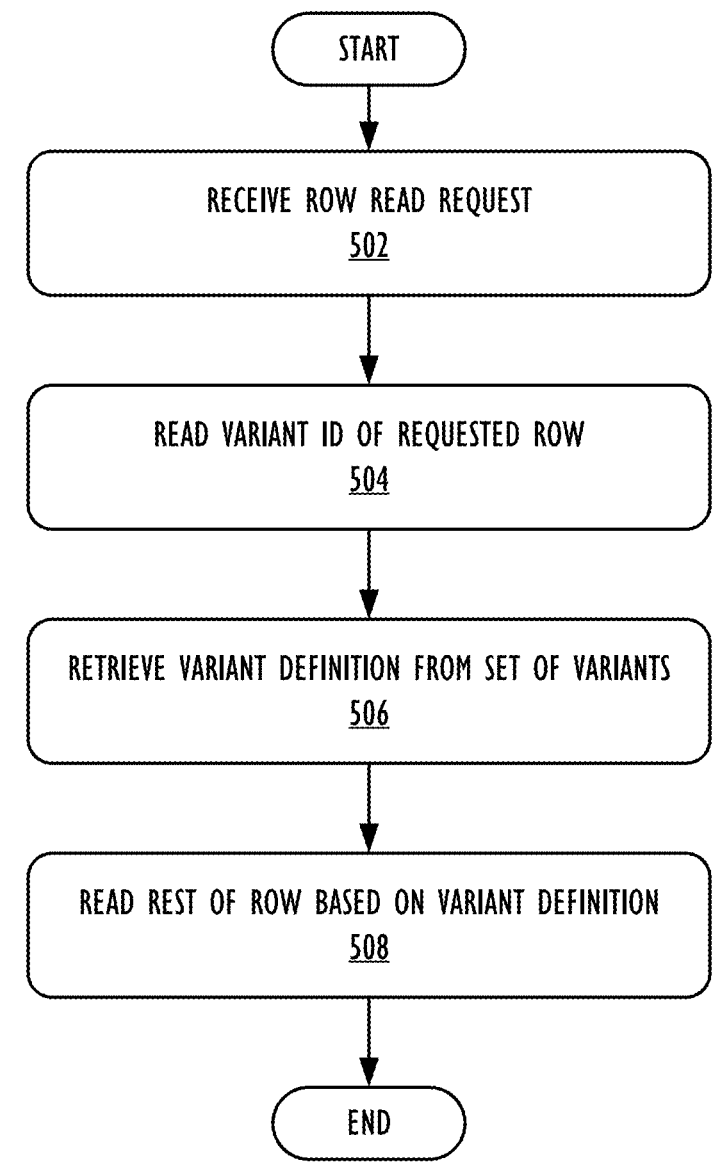
FIG. 5 is a flow diagram illustrating a technique for reading a row in a flex table, according to one embodiment.

FIG. 5 is a flow diagram illustrating a technique 500 for reading a row in a flex table, according to one embodiment. At block 502, a row read request is received by a database application utilizing flex tables. The row read request includes a row identifier which identifies the row to be read. In certain cases multiple rows may be identified. At block 504, a variant ID 118 of a requested row is read. At block 506, a variant definition (e.g., column information) associated with the variant ID is retrieved from the set of variants. The variant definition includes information related to the byte alignment of columns associated with a particular variant. At block 508, the row may be read based on the retrieved variant definition. If more than one row is requested, blocks 504-508 may be repeated for each row. It may be understood that reading any portion of a row, column, or other database portion is not synonymous with loading that row or column from a long term storage device. Rather, read refers to any form of electronic access from any form of memory. For example, when a specific row is requested, the entire row may be read from long-term storage into short-term storage based on the base record size. As another example, multiple rows, or even an entire database, may be maintained in short-term storage (e.g., in RAM), rather than in long-term storage (e.g., hard disk, SSD, tape, etc.). Writing to a particular column in a row may be performed by retrieving a variant definition as with reading and then writing to a specified column based on the variant definition.

Figure 6:
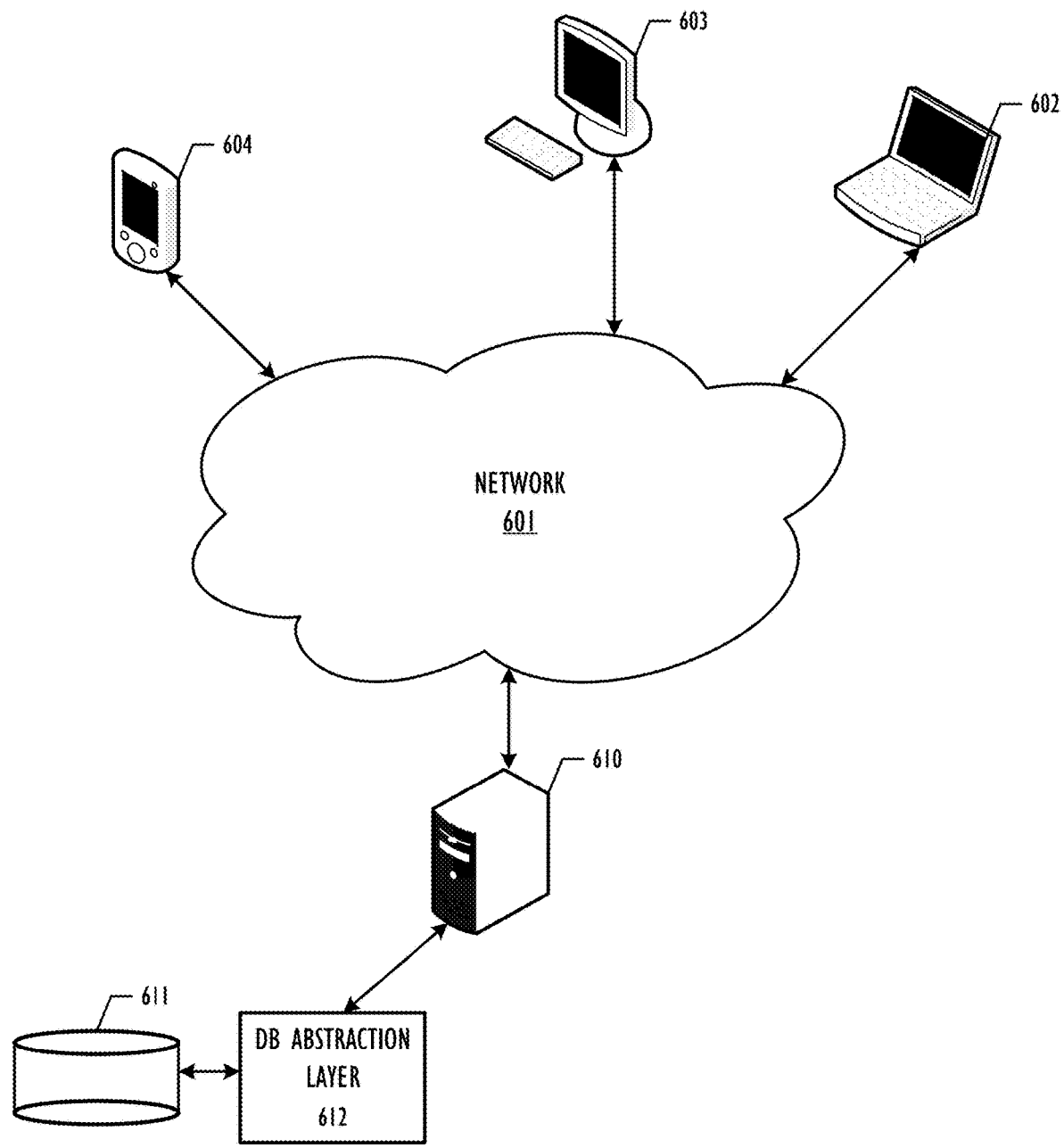
FIG. 6 is a block diagram illustrating a server system that includes a web server that accesses data stored on a database, according to one embodiment

FIG. 6 illustrates a server system that includes a web server 610 that accesses data stored on a database 611 via a database abstraction layer 612, according to one embodiment. Database 611 can be accessed through the database abstraction layer 612 by one or more client devices 602-604 and communicating with web server 610 over network 601. Examples of the network 601 include the internet, intranets, WiFi, or any other suitable computer network. Examples of client devices 602-604 include personal computers, tablets, netbooks, laptops, smartphone, Internet connected device, such as an Internet of Things (IoT) device, or any other suitable device. In this embodiment, the client computer 603, for example, uses a web browser to communicate using the http communications protocol to send a URL which includes request information across network 601 to web server 610. The request information included within the URL typically specifies a database request. The web server 610 processes the URL to obtain the database request information to be supplied to the database 611 resulting in the invocation of the database request specified by the user.

When a database request is complete, web server 610 generates an HTML representation of a web page that has data corresponding to a result set generated when the database request is applied to database 611. This HTML representation of the web page is transmitted back across the network 601 to client computer 603 for display to a user using the web browser. This process of sending a database request, generating the results, generating the HTML web page representation of the results, and returning the representation to the user occurs each time a client devices 602-604, communicates over the network 601 to web server 610. While described in conjunction with a client-server system, nothing herein is intended to limit the scope of the current disclosure in non-client-server system, such as a stand-alone device. For example, in a stand-alone device, databases stored on the device may be accessed by an application running on the device by querying the database directly, or indirectly via another application. Query results may then be returned, either directly to the application, or via the another application.

Figure 7:
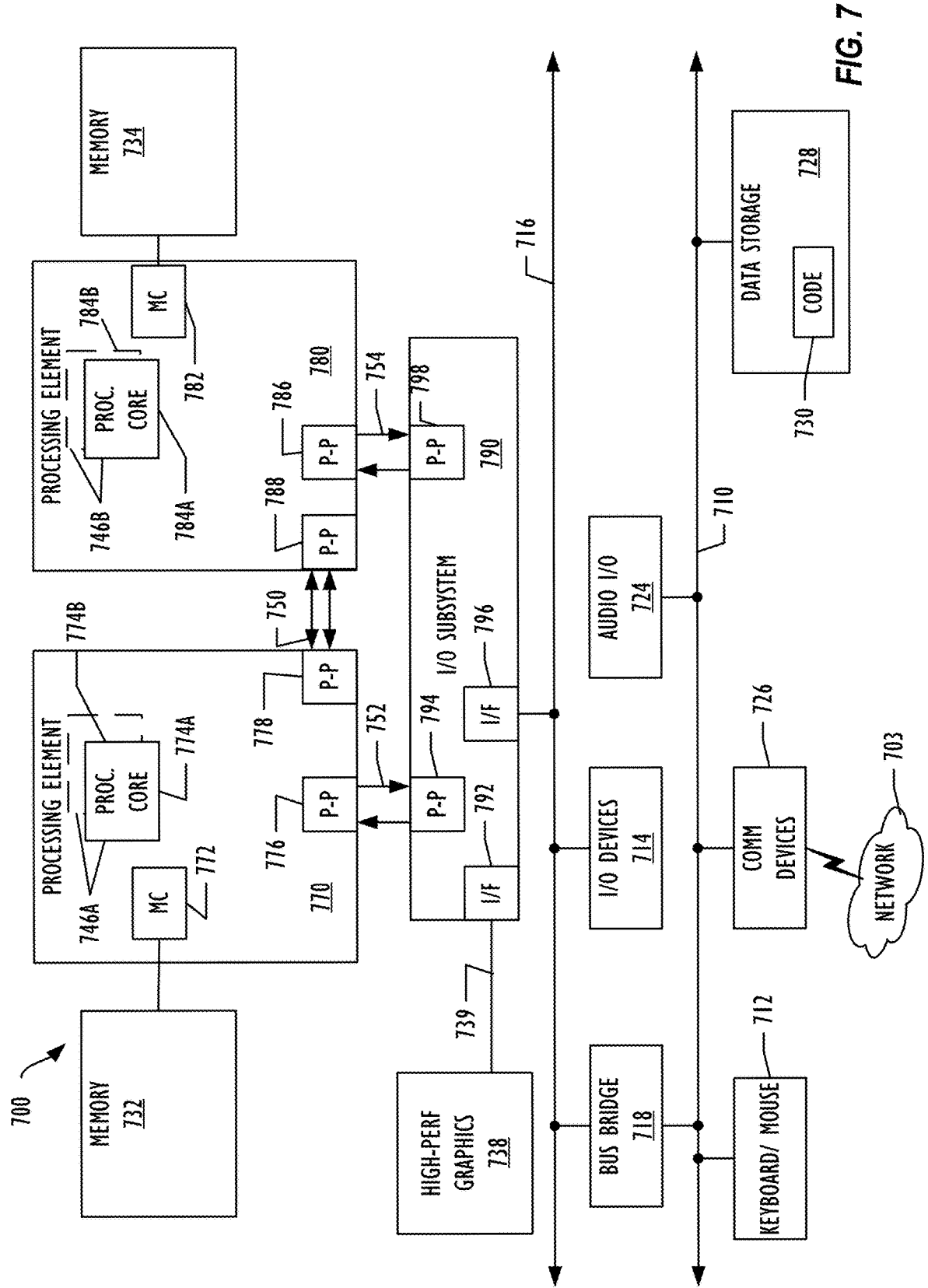
FIG. 7 is a block diagram illustrating a programmable device, according to one embodiment.

Referring now to FIG. 7, a block diagram illustrates a programmable device 700 that may be used for implementing the techniques described herein in accordance with one embodiment. The programmable device 700 illustrated in FIG. 7 is a multiprocessor programmable device that includes a first processing element 770 and a second processing element 780. While two processing elements 770 and 780 are shown, an embodiment of programmable device 700 may also include only one such processing element.

Programmable device 700 is illustrated as a point-to-point interconnect system, in which the first processing element 770 and second processing element 780 are coupled via a point-to-point interconnect 750. Any or all of the interconnects illustrated in FIG. 7 may be implemented as a multi-drop bus rather than point-to-point interconnects.

As illustrated in FIG. 7, each of processing elements 770 and 780 may be multicore processors, including first and second processor cores (i.e., processor cores 774*a* and 774*b* and processor cores 784*a* and 784*b*). Such cores 774*a*, 774*b*, 784*a*, 784*b* may be configured to execute instruction code. However, other embodiments may use processing elements that are single core processors as desired. In embodiments with multiple processing elements 770, 780, each processing element may be implemented with different numbers of cores as desired.

Each processing element 770, 780 may include at least one shared cache 746. The shared cache 746*a*, 746*b* may store data (e.g., instructions) that are utilized by one or more components of the processing element, such as the cores 774*a*, 774*b* and 784*a*, 784*b*, respectively. For example, the shared cache may locally cache data stored in a memory 732, 734 for faster access by components of the processing elements 770, 780. In one or more embodiments, the shared cache 746*a*, 746*b* may include one or more mid-level caches, such as level 2 (L2), level 3 (L3), level 4 (L4), or other levels of cache, a last level cache (LLC), or combinations thereof.

While FIG. 7 illustrates a programmable device with two processing elements 770, 780 for clarity of the drawing, the scope of the present invention is not so limited and any number of processing elements may be present. Alternatively, one or more of processing elements 770, 780 may be an element other than a processor, such as an graphics processing unit (GPU), a digital signal processing (DSP) unit, a field programmable gate array, or any other programmable processing element. Processing element 780 may be heterogeneous or asymmetric to processing element 770. There may be a variety of differences between processing elements 770, 780 in terms of a spectrum of metrics of merit including architectural, microarchitectural, thermal, power consumption characteristics, and the like. These differences may effectively manifest themselves as asymmetry and heterogeneity amongst processing elements 770, 780. In some embodiments, the various processing elements 770, 780 may reside in the same die package.

First processing element 770 may further include memory controller logic (MC) 772 and point-to-point (P-P) interconnects 776 and 778. Similarly, second processing element 780 may include a MC 782 and P-P interconnects 786 and 788. As illustrated in FIG. 7, MCs 772 and 782 couple processing elements 770, 780 to respective memories, namely a memory 732 and a memory 734, which may be portions of main memory locally attached to the respective processors. While MC logic 772 and 782 is illustrated as integrated into processing elements 770, 780, in some embodiments the memory controller logic may be discrete logic outside processing elements 770, 780 rather than integrated therein.

Processing element 770 and processing element 780 may be coupled to an I/O subsystem 790 via respective P-P interconnects 776 and 786 through links 752 and 754. As illustrated in FIG. 7, I/O subsystem 790 includes P-P interconnects 794 and 798. Furthermore, I/O subsystem 790 includes an interface 792 to couple I/O subsystem 790 with a high performance graphics engine 738. In one embodiment, a bus (not shown) may be used to couple graphics engine 738 to I/O subsystem 790. Alternately, a point-to-point interconnect 739 may couple these components.

In turn, I/O subsystem 790 may be coupled to a first link 716 via an interface 796. In one embodiment, first link 716 may be a Peripheral Component Interconnect (PCI) bus, or a bus such as a PCI Express bus or another I/O interconnect bus, although the scope of the present invention is not so limited.

As illustrated in FIG. 7, various I/O devices 714, 724 may be coupled to the first link 716, along with a bridge 718 that may couple the first link 716 to a second link 710. In one embodiment, second link 720 may be a low pin count (LPC) bus. Various devices may be coupled to second link 720 including, for example, a keyboard/mouse 712, communication device(s) 726 (which may in turn be in communication with the computer network 703), and a data storage unit 728 such as a disk drive or other mass storage device which may include code 730, in one embodiment. The code 730 may include instructions for performing embodiments of one or more of the techniques described above. Further, an audio I/O 724 may be coupled to second link 720.

Note that other embodiments are contemplated. For example, instead of the point-to-point architecture of FIG. 7, a system may implement a multi-drop bus or another such communication topology. Although links 716 and 720 are illustrated as busses in FIG. 7, any desired type of link may be used. In addition, the elements of FIG. 7 may alternatively be partitioned using more or fewer integrated chips than illustrated in FIG. 7.

Figure 8:
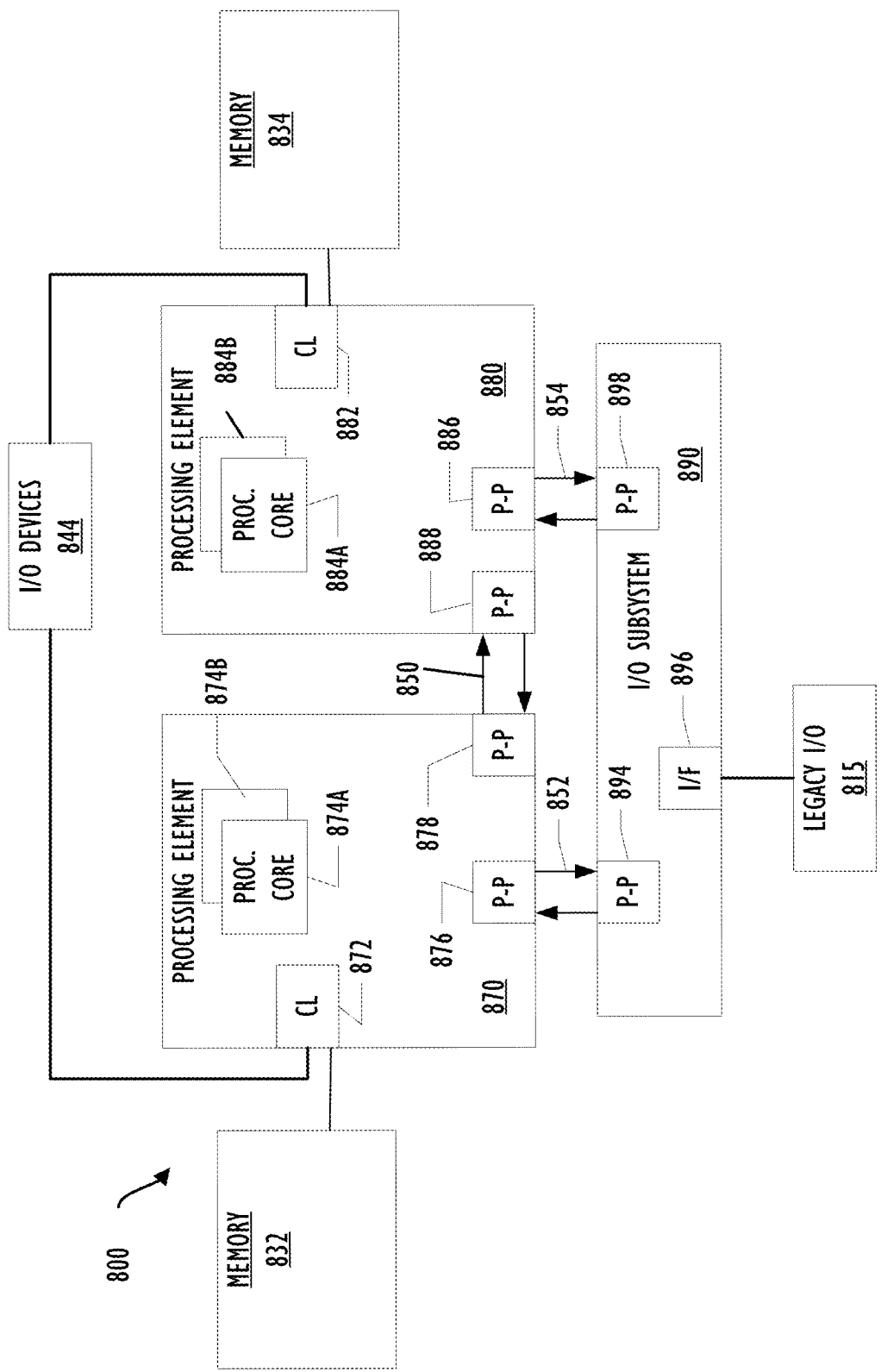
FIG. 8 is a block diagram illustrating a programmable device, according to one embodiment.

Referring now to FIG. 8, a block diagram illustrates a programmable device 800 according to another embodiment. Certain aspects of FIG. 8 have been omitted from FIG. 8 in order to avoid obscuring other aspects of FIG. 8.

FIG. 8 illustrates that processing elements 870, 880 may include integrated memory and I/O control logic ("CL") 872 and 882, respectively. In some embodiments, the 872, 882 may include memory control logic (MC) such as that described above in connection with FIG. 8. In addition, CL 872, 882 may also include I/O control logic. FIG. 8 illustrates that not only may the memories 832, 834 be coupled to the CL 872, 882, but also that I/O devices 844 may also be coupled to the control logic 872, 882. Legacy I/O devices 815 may be coupled to the I/O subsystem 890 by interface 896. Each processing element 870, 880 may include multiple processor cores, illustrated in FIG. 8 as processor cores 874A, 874B, 884A and 884B. As illustrated in FIG. 8, I/O subsystem 890 includes point-to-point (P-P) interconnects 894 and 898 that connect to P-P interconnects 876 and 886 of the processing elements 870 and 880 with links 852 and 854. Processing elements 870 and 880 may also be interconnected by link 850 and interconnects 878 and 888, respectively.

The programmable devices depicted in FIGS. 7 and 8 are schematic illustrations of embodiments of programmable devices that may be utilized to implement various embodiments discussed herein. Various components of the programmable devices depicted in FIGS. 7 and 8 may be combined in a system-on-a-chip (SoC) architecture.

The following examples pertain to further embodiments.

Example 1 is a machine readable medium, on which are stored instructions for accessing flexible record definitions for efficient database storage, comprising instructions that when executed cause a device to: receive a first request to create a first row in a database table, the first request indicating a first set of columns associated with the first row, determine that columns of the first set of columns are included in a second set of columns associated with the database table, select a first variant, from a set of variants, the first variant associated with a third set of columns, the third set of columns including at least the first set of columns, and write the first row to the database table based on the first variant and the third set of columns.

In Example 2, the subject matter of Example 1 optionally includes wherein each variant from the set of variants is associated with a unique set of columns.

In Example 3, the subject matter of Example 2 optionally includes wherein each variant is associated with a variant identifier that is unique to that variant.

In Example 4, the subject matter of Example 3 optionally includes wherein the variant identifier is included as a beginning portion of a binary representation of a row associated with the variant identifier.

In Example 5, the subject matter of Example 2 optionally includes wherein the instructions that when executed cause the device to select the first variant based on a comparison of the first set of columns and the unique set of columns associated with each variant of the set of variants.

In Example 6, the subject matter of Example 2 optionally includes wherein the instructions further comprise instructions that when executed cause the device to: receive a second request to write data to a target column of a second row, the second request comprising at least a row identifier, a first column name and data to be written, read the second row, based on the row identifier, to determine a variant identifier associated with the second row, obtain column information associated with the variant identifier, wherein the column information comprises, for each column associated with the variant identifier, a second column name and a byte alignment, identify the byte alignment of a column by matching the first column name to the second column name, and write the data based on the identified byte alignment.

In Example 7, the subject matter of Example 2 optionally includes wherein the instructions further comprise instructions that when executed cause the device to: receive a third request, the third request indicating a fourth set of columns, compare the fourth set of columns to a set of columns associated with each variant of the set of variants to determine that the fourth set of columns is not associated with any variant of the set of variants, and create a new variant in the set of variants based on the fourth set of columns.

In Example 8, the subject matter of Example 7 optionally includes wherein creating the new variant is based on a determination that a record size of the new variant is smaller than a base record size and wherein the record size of the new variant is different from a record size of another variant of the set of variants.

In Example 9, the subject matter of Example 7 optionally includes wherein the third request includes a request to add a new variant.

In Example 10, the subject matter of Example 2 optionally includes wherein the instructions further comprise instructions that when executed cause the device to: receive an indication to add a new column to the second set of columns, the indication including a column name, and create the new column with the column name in the second set of columns.

In Example 11, the subject matter of Example 1 optionally includes wherein the instructions that when executed cause the device to select the first variant comprise instructions that when executed cause the device to select the first variant based on a variant identifier received in the first request.

Example 12 is a method for accessing flexible record definitions for efficient database storage, the method comprising: receiving an indication to create an index for a flex table, the indication including a column name, identifying one or more variants, of a set of variants, the one or more variants associated with a column having the column name, determining a set of rows associated with each variant of the one or more variants, and creating the index based on the set of rows.

In Example 13, the subject matter of Example 12 optionally includes wherein the column name is associated with each variant of the set of variants and wherein the index is a complete index.

In Example 14, the subject matter of Example 12 optionally includes wherein the one or more variants comprise a number of variants less than the number of variants in the set of variants.

Example 15 is an apparatus for accessing flexible record definitions for efficient database storage, comprising, a memory storing instructions for writing flexible record definitions in a database, a processor operatively coupled to the memory and adapted to execute the instructions stored in the memory to cause the processor to, receive a first request to create a first row in a database table, the first request indicating a first set of columns associated with the first row, determine that columns of the first set of columns are included in a second set of columns associated with the database table, select a first variant, from a set of variants, the first variant associated with a third set of columns, the third set of columns including at least the first set of columns, and write the first row to the database table based on the first variant and the third set of columns.

In Example 16, the subject matter of Example 15 optionally includes wherein each variant from the set of variants is associated with a unique set of columns.

In Example 17, the subject matter of Example 16 optionally includes wherein each variant is associated with a variant identifier that is unique to that variant.

In Example 18, the subject matter of Example 17 optionally includes wherein the variant identifier is included as a beginning portion of a binary representation of a row associated with the variant identifier.

In Example 19, the subject matter of Example 16 optionally includes wherein the instructions stored in the memory further cause the processor to select the first variant based on a comparison of the first set of columns and the unique set of columns associated with each variant of the set of variants.

In Example 20, the subject matter of Example 16 optionally includes wherein the instructions stored in the memory further cause the processor to: receive a second request to write data to a target column of a second row, the second request comprising at least a row identifier, a first column name and data to be written, read the second row, based on the row identifier, to determine a variant identifier associated with the second row, obtain column information associated with the variant identifier, wherein the column information comprises, for each column associated with the variant identifier, a second column name and a byte alignment, identify the byte alignment of a column by matching the first column name to the second column name, and write the data based on the identified byte alignment.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

We claim:

1. A machine readable medium comprising instructions for accessing flexible record definitions for efficient database storage, the instructions, when executed, to cause at least one processor to:
    access a first request to create a first row in a database table, the first request indicating a first set of columns to be populated with data from the first request;
    determine that the first set of columns are included in a second set of columns associated with the database table, the second set of columns representing possible columns to be used for storing data in the database table;
    identify a third set of columns that includes the first set of columns and a first column not included in the first set of columns;
    identify a fourth set of columns that includes the first set of columns and a second column not included in the first set of columns, the second column different from the first column;
    select the third set of columns for use when writing the first row to the database table, the selection of the third set of columns based on a comparison of a first size of data stored by the first column and a second size of data stored by the second column; and
    write the first row to the database table based on the third set of columns.

2. The machine readable medium of claim 1, wherein the third set of columns is represented as a first variant from among a set of variants, each variant from the set of variants being associated with a unique set of columns.

3. The machine readable medium of claim 2, wherein each variant is associated with a variant identifier that is unique to that variant.

4. The machine readable medium of claim 3, wherein the variant identifier is included as a beginning portion of a binary representation of a row associated with the variant identifier.

5. The machine readable medium of claim 2, wherein the instructions, when executed, cause the at least one processor to select the first variant based on a comparison of the first set of columns and the unique set of columns associated with each variant of the set of variants.

6. The machine readable medium of claim 2, wherein the instructions, when executed cause the at least one processor to:
    access a second request to write data to a target column of a second row, the second request including at least a row identifier, a first column name and data to be written;

read the second row, based on the row identifier, to determine a variant identifier associated with the second row;
obtain column information associated with the variant identifier, wherein the column information includes, for each column associated with the variant identifier, a second column name and a byte alignment;
identify the byte alignment of a column by matching the first column name to the second column name; and
write the data based on the identified byte alignment.

7. The machine readable medium of claim 2, wherein the instructions, when executed, cause the at least one processor to:
receive a third request, the third request indicating a fifth set of columns;
compare the fifth set of columns to previous sets of columns to determine that the fifth set of columns is not associated with any variant of the set of variants; and
create a new variant in the set of variants based on the fifth set of columns.

8. The machine readable medium of claim 7, wherein the instructions, when executed, cause the at least one processor to create the new variant based on a determination that a record size of the new variant is smaller than a base record size and wherein the record size of the new variant is different from a record size of another variant of the set of variants.

9. The machine readable medium of claim 7, wherein the third request includes a request to add a new variant.

10. The machine readable medium of claim 2, wherein the instructions, when executed, cause the at least one processor to:
receive an indication to add a new column to the second set of columns, the indication including a column name; and
create the new column with the column name in the second set of columns.

11. The machine readable medium of claim 1, wherein the instructions, when executed, cause the at least one processor to select the third set of columns based on a variant identifier received in the first request.

12. An apparatus for accessing flexible record definitions for efficient database storage, comprising:
a memory storing instructions for writing flexible record definitions in a database; and
a processor to execute the instructions stored in the memory to cause the processor to:
access a first request to create a first row in a database table, the first request indicating a first set of columns to be populated with data from the first request;
determine that the first set of columns are included in a second set of columns associated with the database table, the second set of columns representing possible columns to be used for storing data in the database table;
identify a third set of columns that includes the first set of columns and a first column not included in the first set of columns;
identify a fourth set of columns that includes the first set of columns and a second column not included in the first set of columns, the second column different from the first column;
select the third set of columns for use when writing the first row to the database table, the selection of the third set of columns based on a comparison of a first size of data stored by the first column and a second size of data stored by the second column; and
write the first row to the database table based on the third set of columns.

13. The apparatus of claim 12, wherein the third set of columns is represented as a first variant from among a set of variants, each variant from the set of variants being associated with a unique set of columns.

14. The apparatus of claim 13, wherein each variant is associated with a variant identifier that is unique to that variant.

15. The apparatus of claim 14, wherein the variant identifier is included as a beginning portion of a binary representation of a row associated with the variant identifier.

16. The apparatus of claim 13, wherein the processor is to select the first variant based on a comparison of the first set of columns and the unique set of columns associated with each variant of the set of variants.

17. The apparatus of claim 13, wherein the instructions stored in the memory further cause the processor to:
receive a second request to write data to a target column of a second row, the second request including at least a row identifier, a first column name and data to be written;
read the second row, based on the row identifier, to determine a variant identifier associated with the second row;
obtain column information associated with the variant identifier, wherein the column information comprises, for each column associated with the variant identifier, a second column name and a byte alignment;
identify the byte alignment of a column by matching the first column name to the second column name; and
write the data based on the identified byte alignment.

18. A method for accessing flexible record definitions for efficient database storage, the method comprising
accessing, by executing an instruction with at least one processor, a first request to create a first row in a database table, the first request indicating a first set of columns to be populated with data from the first request;
determining, by executing an instruction with the at least one processor, that the first set of columns are included in a second set of columns associated with the database table, the second set of columns representing possible columns to be used for storing data in the database table;
identifying, by executing an instruction with the at least one processor, a third set of columns that includes the first set of columns and a first column not included in the first set of columns;
identifying, by executing an instruction with the at least one processor, a fourth set of columns that includes the first set of columns and a second column not included in the first set of columns, the second column different from the first column;
selecting, by executing an instruction with the at least one processor, the third set of columns for use when writing the first row to the database table, the selection of the third set of columns based on a comparison of a first size of data stored by the first column and a second size of data stored by the second column; and
writing, by executing an instruction with the at least one processor, the first row to the database table based on the third set of columns.

19. The method of claim 18, wherein the third set of columns is represented as a first variant from among a set of variants, each variant from the set of variants being associated with a unique set of columns.

20. The method of claim 19, wherein each variant is associated with a variant identifier that is unique to that variant.

\* \* \* \* \*